United States Patent
Shibata

(10) Patent No.: US 6,760,178 B2
(45) Date of Patent: Jul. 6, 2004

(54) DISK MEMORY APPARATUS COMPENSATING FOR TEMPERATURE IN A CIRCUIT FOR MONITORING THE BACK ELECTROMOTIVE FORCE OF A VOICE COIL MOTOR, AND METHOD FOR CONTROLLING OF A DISK MEMORY APPARATUS

(75) Inventor: Satoshi Shibata, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 225 days.

(21) Appl. No.: 09/797,978

(22) Filed: Mar. 5, 2001

(65) Prior Publication Data

US 2001/0026414 A1 Oct. 4, 2001

(30) Foreign Application Priority Data

Mar. 27, 2000 (JP) .......................................... 2000-086386

(51) Int. Cl.$^7$ .............................................. G11B 21/02

(52) U.S. Cl. ...................................... 360/75; 360/78.12

(58) Field of Search ................................ 360/75, 78.08, 360/78.07, 78.12; 318/561, 569

(56) References Cited

U.S. PATENT DOCUMENTS

| 5,128,813 | A | * | 7/1992 | Lee .......................... 360/78.07 |
| 5,455,723 | A | * | 10/1995 | Boutaghou et al. ........... 360/75 |
| 5,835,302 | A | | 11/1998 | Funches et al. |
| 5,844,743 | A | | 12/1998 | Funches |
| 5,898,286 | A | | 4/1999 | Clare et al. |
| 6,496,319 | B1 | * | 12/2002 | Kusumoto et al. ............ 360/75 |

FOREIGN PATENT DOCUMENTS

| JP | 4188475 | 7/1992 |
| JP | 11-25626 | 1/1999 |

* cited by examiner

*Primary Examiner*—David Hudspeth
*Assistant Examiner*—K. Wong
(74) *Attorney, Agent, or Firm*—Pillsbury Winthrop LLP

(57) ABSTRACT

At the time of the loading of head, the CPU flows a plurality of different currents to VCM, and by reading the back electromotive force monitor value of the back electromotive force monitor circuit each time, the calibration value of the circuit is obtained, and by using this calibration value, head-loading control is executed. The calibration value obtained previously is compensated on the basis of temperature changes, temperature compensation coefficient that shows the relation between the variation of the calibration value of the back electromotive force monitor circuit, and the difference between the above-mentioned two measured temperatures.

14 Claims, 5 Drawing Sheets

170 COUNTER ELECTROMOTIVE FORCE MONITOR CIRCUIT

DISK MEMORY APPARATUS COMPENSATING FOR TEMPERATURE IN A CIRCUIT FOR MONITORING THE BACK ELECTROMOTIVE FORCE OF A VOICE COIL MOTOR, AND METHOD FOR CONTROLLING OF A DISK MEMORY APPARATUS

CROSS-REFERENCE TO RELATED APPLICATIONS

This application is based upon and claims the benefit of priority from the prior Japanese Patent Application No. 2000-086386, filed Mar. 27, 2000, the entire contents of which are incorporated herein by reference.

BACKGROUND OF THE INVENTION

The present invention relates to a disk memory apparatus that controls the loading and unloading of a head, in accordance with the back electromotive force generated in a voice coil motor (VCM) and detected by a monitoring circuit. More particularly, the invention relates to a disk memory apparatus having the function of compensating for temperature in a circuit for monitoring the back electromotive force of a VCM, and a method for controlling of a disk memory apparatus.

Various types of disk apparatuses are known, in which a head records data on, and reproduces data from, a disk. Recently, compact magnetic disk apparatuses have been developed, in which the head is loaded and unloaded. It should be noted that the voice coil motor drives a head actuator and moves a head in a radial direction of a disk (recording media). The head remains retracted to a ramp mechanism located outside the periphery of the disk, until a read/write operation is started. When the disk is rotated to perform the read/write operation, the head is moved from the ramp (ramp mechanism) to a position above the disk. The read/write operation is then carried out under the control of a host apparatus. Shortly before stopping the rotation of the disk, the head is retracted from a position above the disk, back to the ramp.

The moving of the head from the ramp to any position above the disk is called "head loading." The moving of the head from any position above the disk to the ramp is called "head unloading."

A magnetic disk apparatus of this type, in which the magnetic head is load to a position above the magnetic disk and unloaded from that position to the ramp, has a circuit for monitoring the back electromotive force generated in the voice coil motor (VCM) that drives the head. The speed of the VCM is calculated from the back electromotive force monitored by the circuit. The loading and unloading of the head is controlled in accordance with the speed of the VCM calculated.

Even if the speed of the VCM is 0, the VCM resistance changes with temperature and the amplifier gain varies. Inevitably, the output of the circuit for monitoring the back electromotive force may be proportional to the current flowing in the VCM.

Jpn. Pat. Appln. KOKAI Publication No. 11-25626 discloses a calibration technology in which a plurality of currents (VCM currents) flow through the VCM prior to the head loading. In the prior art, the offset of the circuit for monitoring back electromotive force is compensated for, in accordance with the output of the circuit.

In the prior art, the output of the monitor circuit is calibrated by passing a current in the VCM while the VCM remains retracted to the ramp mechanism before the head loading. This calibration makes it possible to properly compensate for the output of the monitor circuit in the head-loading control and to drive the VCM at an appropriate speed. A stable head loading can thereby be accomplished.

However, the temperature in the apparatus (particularly, the temperature of the VCM) at the head unloading is not always the same as the temperature at the head loading. In other words, the possibility of a temperature rising is generally high since a current keeps flowing in the VCM during the period between the head loading and the head unloading. Furthermore, the temperature in the apparatus may fall, depending on the changes in the environmental temperature. If the temperature of the VCM changes, the resistance of the VCM will change. In this case, if the output of the monitor circuit cannot be reliably corrected, the calibration value obtained during the head loading is applied to correct the output.

On the other hand, even if the calibration is executed during the head unloading in the same way as during the head loading, the unloading may not be controlled reliably. This is the reason why the head is positioned above the disk (in other words, head is not retracted to the ramp and fixed at the ramp as during the head loading). That is, if the current flows through the VCM during the head unloading, the VCM is driven and the head will move. Therefore, no reliable calibration can be accomplished as long as a current is flowing through the VCM.

Thus, if the resistance of the VCM varies due to the change of the temperature from the time of head loading to the time of head unloading, the output of the monitor circuit is calibrated incorrectly during head unloading in the same way as during the head loading. Consequently the speed of the head unloading is controlled incorrectly, the control of the speed is impossible and the control of the head unload may oscillate.

BRIEF SUMMARY OF THE INVENTION

The present invention has been made in view of the foregoing. An object of the invention is to provide a disk memory apparatus having the function of compensating for temperature in a circuit for monitoring the back electromotive force of a VCM, and a method of compensating for temperature in a circuit for monitoring the back electromotive force of a VCM. In the apparatus and method, the relation between the change in temperature and the change in the calibrated output of a circuit for monitoring a back electromotive force is determined first, and the output calibrated at the head loading is corrected at the head unloading, in accordance with the temperature difference between the head loading and the head unloading.

According to an aspect of the present invention there is provided a disk memory apparatus comprising: a head configured to read or write data on or from a disk; a voice coil motor configured to move the head in a radial-direction of the disk in order to execute head-loading or head-unloading of the head; a monitor circuit configured to detect a back electromotive force generated by the voice coil motor; a first processor configured to supply a plurality of different currents to the voice coil motor at the time of the head-loading, and output a first value based on back electromotive forces each of which corresponds to the plurality of different currents and is detected the monitor circuit; a temperature sensor configured to detect a temperature of the disk memory apparatus; a second processor configured to output a second value based on a first temperature detected by the temperature sensor at the time of the head-loading and a second temperature by the temperature sensor at the time of the head-unloading, and a load/unload controller configured to control the head-loading or the head-unloading of the head in such a manner that the load/unload controller drives the voice coil motor according to the first calibration value at the time of the head-loading and drives the voice coil motor according to the second calibration value at the time of the head-unloading.

According to another aspect of the present invention there is provided a disk memory apparatus comprising: a head for reading or writing data on or from a disk; voice coil motor for moving the head in a radial-direction of the disk in order to execute head-loading or head-unloading of the head; monitor means for detecting back electromotive force generated by the voice coil motor; first calibration means for supplying a plurality of different currents to the voice coil motor at the time of the head-loading, and outputting a first value based on back electromotive forces each of which corresponds to the plurality of different currents and are detected the monitor circuit; a temperature sensor for detecting a temperature of the disk memory apparatus; second calibration means for determining a second calibration value of the monitor means on the basis of a first temperature detected by the temperature sensor at the time of the head-loading and a second temperature by the temperature sensor at the time of the head-unloading, and load/unload control means for controlling the head-loading or the head-unloading of the head in such a manner that the load/unload control means drives the voice coil motor according to the first calibration value at the time of the head-loading and drives the voice coil motor according to the second calibration value at the time of the head-unloading.

According to another aspect of the present invention there is provided a method for controlling of a disk memory apparatus comprising the steps of: supplying a plurality of different currents to voice coil motor at the time of head-loading; detecting back electromotive forces of the voice coil motor on the basis of the plurality of different currents by monitor circuit; determining a first value of the monitor circuit on the basis of the back electromotive forces; detecting a first temperature of the disk memory apparatus; controlling the voice coil motor according to the first value to execute the head-loading; detecting a second temperature of the disk memory apparatus; determining a calibration value of the monitor circuit on the basis of a first temperature and the second temperature, and controlling the voice coil motor according to the second value to execute the head-unloading.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described, with reference to the accompanying drawings.

Figure 1:
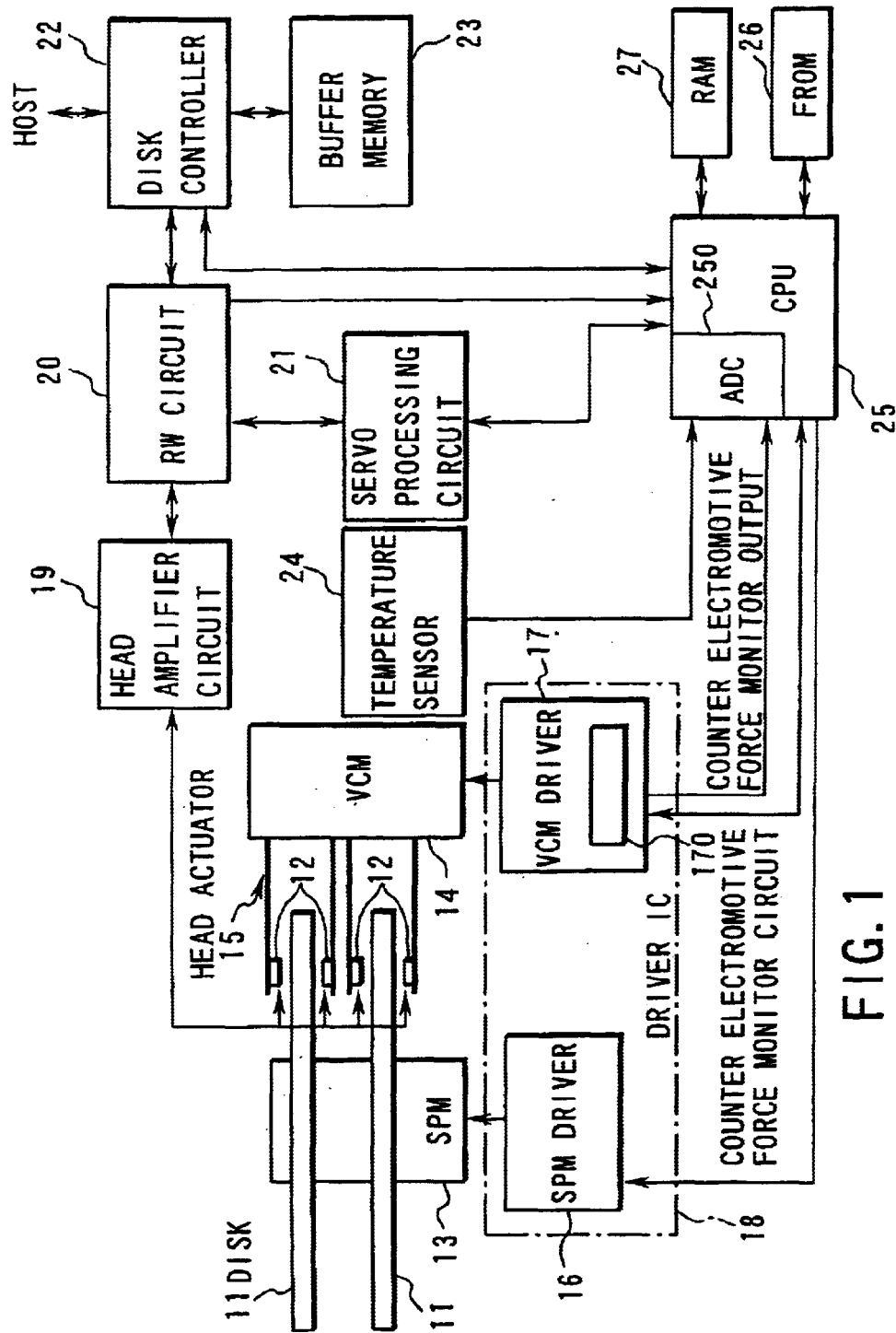
FIG. 1 is a block diagram showing a magnetic disk apparatus according to an embodiment of the present invention.

FIG. 1 is a block diagram showing a magnetic disk related to an embodiment of the present invention.

The magnetic disk apparatus (HDD) of FIG. 1 comprises two disks (magnetic disks) 1 and four heads 12. The disks 1 area recording media on which data may be magnetically recorded. The heads 12 are designed to write (or record) data on the disks 11 and read (or reproduce) data from the disks 11. More or less disks may be incorporated in the apparatus. That is, the apparatus may comprise three or more disks or only one disk. More or less heads may be provided, in proportion to the number of disks 11 incorporated in the apparatus.

Each disk 11 has a recording surface, which in turn has many concentric circular tracks (not illustrated). On each track, the servo regions (not illustrated) are arranged at regular intervals. The servo regions are provided, each for recording servo information that is used to accomplish seeking and positioning of one head 12. Provided among the servo regions are sectors (data sectors), each for recording a unit of data. The servo regions are arranged in each track at regular intervals, such that the corresponding servo regions of the tracks are aligned in a radial direction of the disk 11.

As shown in FIG. 1, the magnetic disk apparatus further comprises a spindle motor 13 (hereinafter referred to as "SPM 13", a voice coil motor 14 (hereinafter referred to as "VCM 14"), and four head actuators (rotary-type head actuator) 15. The SPM 13 rotates the disk 11 at high speed. Each head actuator 15 holds one head 12 at its distal end. When the VCM 14 rotates the head actuator 15 through an angle, the actuator 15 moves the head 12 in the radial direction of the disk 11, thus performing a seeking of the head 12. The head 12 is then positioned at a target track.

Figure 2:
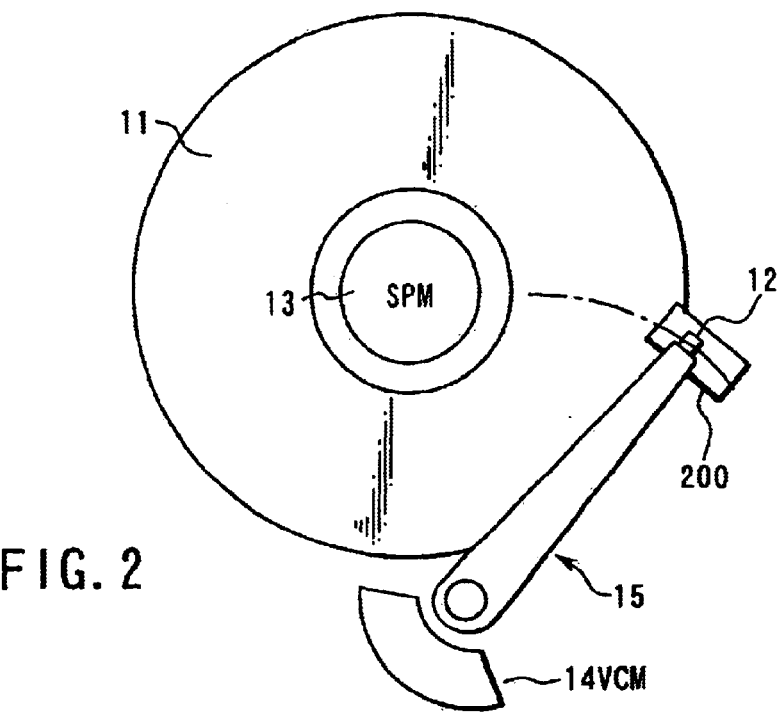
FIG. 2 is a diagram explaining the retracted state (unloaded state) of the head 12 provided in the magnetic disk apparatus of FIG. 1.

As shown in FIG. 2, a ramp 200 is arranged at the outer circumference of the disk 11. The ramp 200 holds the head 12 retracted from any position above the disk 11 after the disk 11 stops rotating.

The magnetic disk apparatus further comprises an SPM driver (SPM driving circuit) 16, a VCM driver (actuator driving circuit) 17, and a CPU 25. The SPM driver 16 supplies a current (SPM current) to the SPM 13, thereby driving the SPM 13. The VCM driver 17 supplies a current to the VCM 14, driving the VCM 14. The SPM driver 16 and VCM driver 17 are provided in the form of a one-chip driver IC 18. The CPU 25 determines the values of the currents supplied from the drivers 16 and 17 to the SPM 13 and VCM 14, respectively, respectively.

Figure 3:
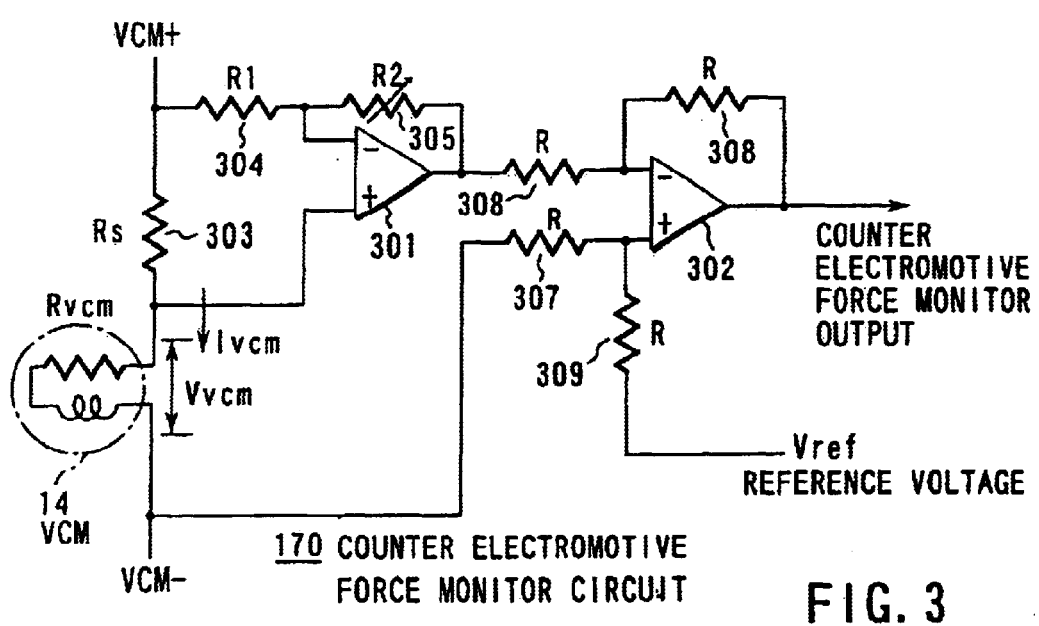
FIG. 3 is a diagram illustrating, in detail, the monitor circuit shown in FIG. 1.
Figure 4:
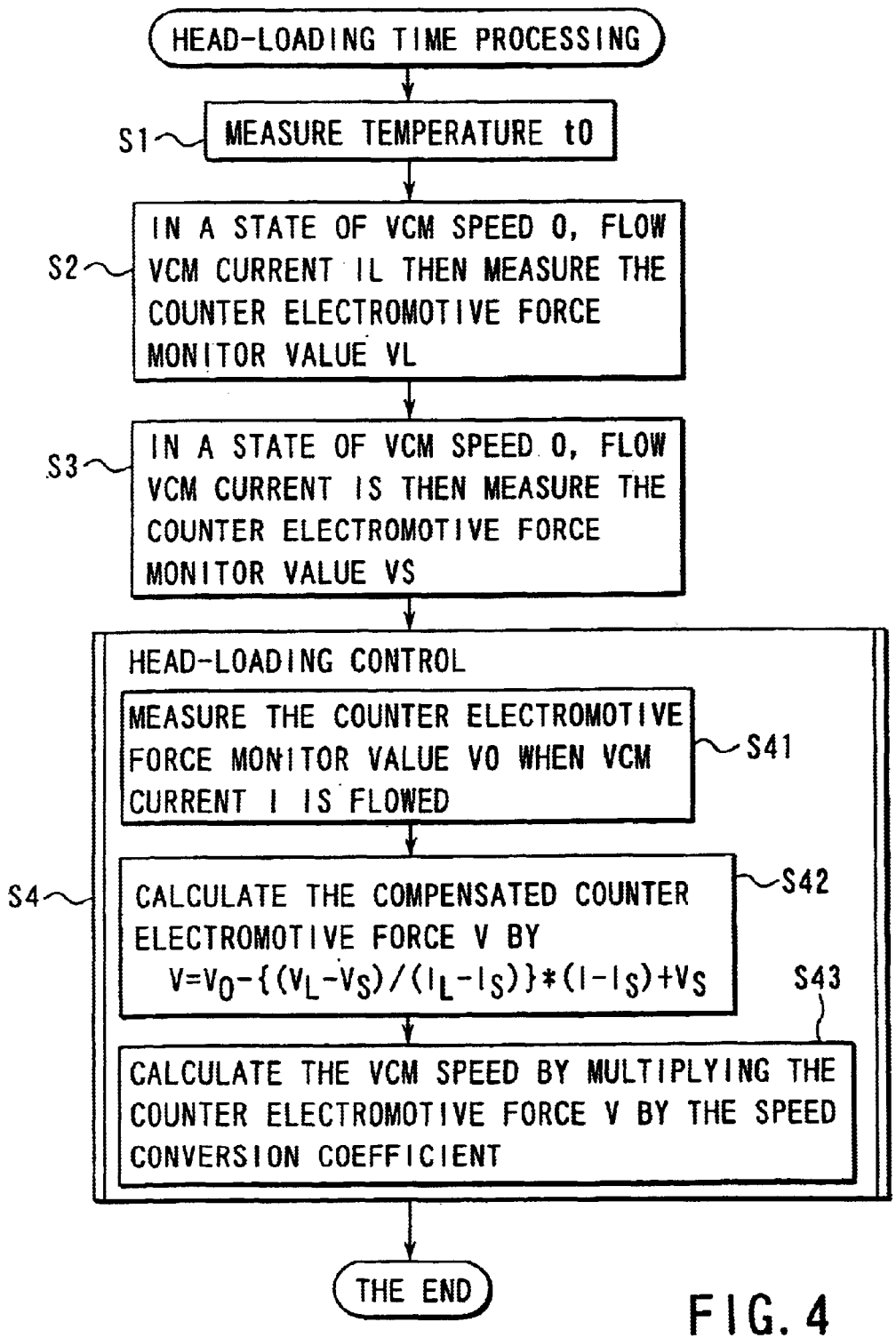
FIG. 4 is a flowchart explaining the sequence of process, including calibration, which is performed during the head loading in the magnetic disk apparatus.

The VCM driver 17 has a monitor circuit 170 for monitoring the back electromotive force generated in the VCM 14. The monitor circuit 170 has a well-known circuit configuration. As shown in FIG. 3, the circuit 170 is connected to the VCM 14.

After undergoing the seeking and positioning, the head 12 is located above the target track. The head 12 scans the target track, as the disk 11 is rotating at high speeds. The head 12 reads the servo information, one item after another, from the servo regions arranged in the target track at regular intervals. In addition, the head 12 reads or writes data on the target sector.

As shown in FIG. 1, the magnetic disk apparatus further comprises a head amplifier circuit (head IC) 19, a R/W (read/write) circuit 20, a servo processing circuit 21, a disk controller 22, a buffer memory 23, and a temperature sensor 24.

The head 12 is electrically connected to the head amplifier circuit (head IC) 19 that is mounted on, for instance, a flexible printed circuit (FPC) provided in the apparatus. The head amplifier circuit 19 selects one or more of the heads 12 and supplies and receives read/write signals to and from the heads 12, under the control of the CPU 25. The head amplifier circuit 19 amplifies the analog outputs (read signals) of the heads 12. Further, the circuit 19 processes the write data supplied from the R/W circuit 20. The write data processed is supplied to the heads 12.

The R/W circuit 20 performs several functions, which are AGC (Automatic Gain Control) function, decoding function, encoding function (write channel), pulsating function and extracting function. The AGC function is to amplify, to a certain voltage, the analog output (read signal) of the head 12 that has been read from the disk 11 by the head 12 and amplified by the head amplifier circuit 19. The decoding function is to decode the data, e.g., NRZ code generated from the read signal amplified by the AGC function. The encoding function is to encode data before the data is recorded on the disk 11. The pulsating function to render read signals pulsating so that information may be extracted from the read signals. The extacting function is to extract burst data from the servo information in accordance with the timing signal (burst timing signal) supplied from the servo processing circuit 21. The burst data is supplied to the CPU 25. Using the servo data, the CPU 25 performs a control to position each head 12 at a target track.

The servo processing circuit 21 performs two functions. The first function is to generate various timing signals, including the burst timing signals for obtaining servo information from read pulses output from the R/W circuit 20. The second function is to extract a cylinder code from the servo information. The cylinder code is supplied to the CPU 25. Using the cylinder code, the CPU 25 controls the seeking operation to position each head 12 at a target track.

The disk controller 22 is connected to a host system (hereinafter referred to as "host") that utilizes the magnetic disk apparatus (HDD). The disk controller 22 performs three functions, which are interface control function, disk control function and buffer control function. The interface control function controls the commands supplied from the host (write command, read command, and the like) and the communication of data. The disk control function controls data transfer between the disk controller 22 and the disk 11. The buffer control function controls the buffer memory 23 as will be described below.

The buffer memory 23 is used as a write-cache in most cases, for temporarily storing data (write data) which has been transferred from the host and which should be recorded on the disk 11. The buffer memory 23 functions as a read-cache, too, for temporarily storing data (read data) which has been read from the disk 11 and which should be transferred to the host. The buffer memory 23 is, for instance, a RAM (Random Access Memory).

The temperature sensor 24 is located near the VCM 14 and detects the temperature of the VCM 14 provided in the magnetic disk apparatus. The sensor 24 generates temperature data representing the temperature it has detected. The temperature data is supplied to the CPU 25.

The CPU 25 controls the magnetic disk apparatus (HDD) in accordance with a control program. More specifically, the CPU 25 controls the seeking and positioning of the head 12 in accordance with the cylinder code extracted from the servo processing circuit 21 and burst data extracted from the R/W circuit 20. The CPU 25 controls the disk controller 22, which performs disk access control (read/write access control) in accordance with the read/write command supplied from the host.

The CPU25 also controls the loading/unloading of the head 12. CPU25 incorporates an analog/digital converter (hereinafter referred to as "ADC"). To carry out head loading, the ADC receives the output of the monitor circuit 170. The current supplied to the VCM 14 is switched, thereby calibrating the back electromotive force output from the monitor circuit 170. The back electromotive force, thus calibrated, is applied, determining the speed of the VCM 14.

To perform head unloading, the back electromotive force calibrated at the loading is corrected in accordance with the difference between the temperatures the sensor 24 detected during the loading and the unloading, respectively. The speed of the VCM 14 is calculated from the back electromotive force thus corrected.

As shown in FIG. 1, the magnetic disk apparatus further comprises a flash ROM (Read Only Memory) 26 and a RAM (Random Access Memory) 27. The flash ROM 26 and the RAM 27 are connected to the CPU 25. The flash ROM 26 is a programmable non-volatile memory that stores the control program. The RAM 27 that provides the work region of the CPU 25. The flash ROM 26 (hereinafter referred to as "FROM 26") stores the information showing the relation between the temperature changes and the changes in the back electromotive force calibrated.

It will be described how the heads 12 are loaded and unloaded in the magnetic disk apparatus (HDD) shown in FIG. 1.

Let us assume that the apparatus remains off or in power-saving mode. The SPM 13 remains to rotate the disks 11. The heads 12 stay in retracted state at the ramp 200.

When the host gives instructions to the apparatus to operate the SPM 13, the CPU25 activates the SPM 13, keeping the heads 12 retracted at the ramp 200. When SPM 13 reaches the regular rotation speed and the disks 11 reach a stable rotation speed, the CPU 25 drives VCM14, whereby the head 12 is moved to a position above the disk 11.

To stop the SPM 13, the VCM14 is driven (in a direction opposite to the time of loading). The head-unloading control is thereby achieved, retracting the head 12 from that position above the disk 11 to the ramp 200. When the head 12 reaches the ramp 200, the head actuator (i.e., mechanism for driving the head 12) is fixed in place by a latch (not shown), preventing the head 12 from jumping out of the ramp 200. At this stage, the CPU 25 stops the SPM 13.

Next, the process, including the calibration during the head loading, will be described with reference to the flowchart of FIG. 3, in conjunction with the operation of the monitor circuit 170 shown in FIG. 3.

Like the monitor circuit provided in the conventional magnetic disk apparatus, the monitor circuit 170 comprises operational amplifiers (differential amplifiers) 301 and 302 and resistors 303 to 309. The resistor 303 is a sense resistor for detecting the current flowing in VCM14 (VCM current) and converting the same into a voltage. The resistor 303 has a resistance Rs. The resistors (first and second resistors) 304 and 305 have resistances R1 and R2, respectively. The resistances R1 and R2 determine the gain of the first-state amplifier 301. The resistors 306–309 have the same resistance R. The monitor circuit 170 differs from the conventional one in that the circuit elements, including at least resistors 304 and 305, are provided in the form of an integrated circuit that is incorporated the driver IC 18. The resistances R1 and R2 of the resistors 304 and 305 are of such values that the CPU 25 can achieve variable setting via, for instance, the serial interface. The monitor circuit 170 differs from the conventional one, also in that no temperature sensitive elements are used for the resistor 305.

The monitor circuit 170 of FIG. 3 detects the counter electromotive voltage V of the VCM 14. The voltage V is given by the following equation:

$$V=-(Vvcm-Ivcm*Rs*R2/R1)+Vref \quad (1)$$

Where Vvcm is the voltage (Ivcm*Rvcm+V) applied across the VCM 14, Ivcm is the current flowing in the VCM 14, Rvcm is the Resistance of the VCM 14, Rs is the sense resistance, and Vref is the reference voltage.

Assume that the VCM 14 and the monitor circuit 170 remain in an ideal state that satisfies the following:

$$Rvcm=Rs*R2/R1 \quad (2)$$

Or $$Ivcm*Rvcm=Ivcm*Rs*R2/R1 \quad (3)$$

If the speed of VCM 14 is 0, the back electromotive force (VCM back electromotive force), i.e., the output of the monitor circuit 170, will not change, no matter what kind of a current (VCM current) Ivcm flows through the VCM 14. In other words, the ideal state is the state that the output value of the monitor circuit 170 is independent of the current (VCM current) Ivcm.

In the conventional method, a temperature sensitive element is used as R2 (or resistor 305) so that the resistance R2 will follow, as much as possible, the change that the resistance (VCM resistance) Rvcm of the VCM 14 undergoes as the temperature changes. It is very difficult, however, to provide such a temperature sensitive element. It is all the more difficult to use an optimum temperature sensitive element for each apparatus. This because the temperature-change characteristics vary from an apparatus to another.

In the present embodiment, the resistances R1 and R2 of the resistors 304 and 305) can be varied at the start of head loading, while passing specified VCM current in VCM14 by the control of CPU25. The back electromotive force can be detected by changing the combination of R1 and R2 in various ways. Also, the electromotive force can be detected, on the assumption that the combination that makes the monitored value the smallest would be resistances R1 and R2 that satisfy the above equation (3). The setting of R1 and R2 at that time may therefore be adopted. Therefore, at least during the head loading, the VCM 14 and the monitor circuit 170 remain in a state very similar to the ideal state that satisfies the -mentioned equation (3).

Figure 6:
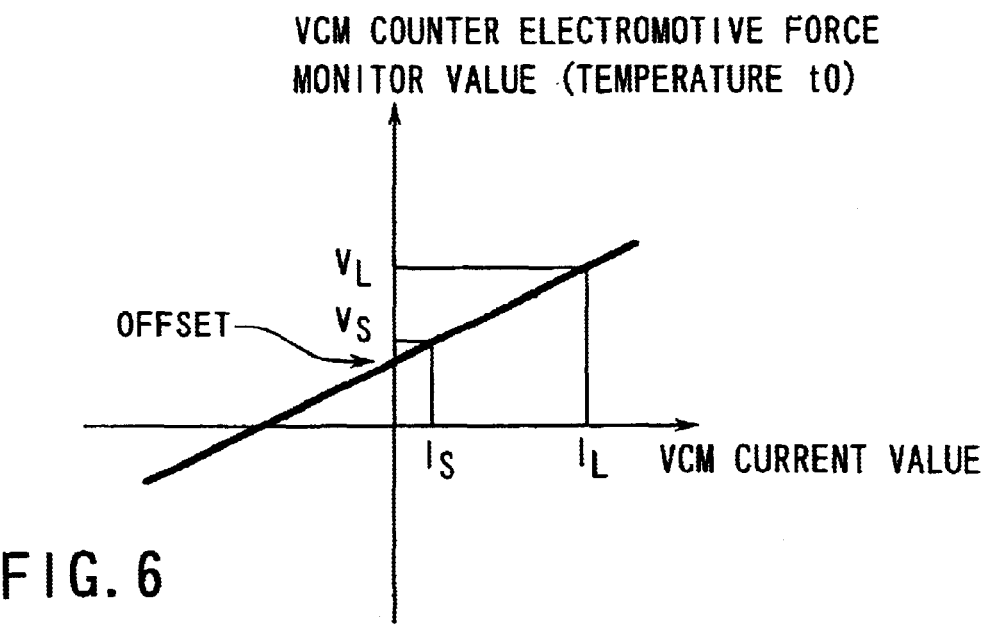
FIG. 6 illustrates a relation the current flowing in the VCM provided in the apparatus may have with the output of the monitor circuit.

Although the VCM 14 and the monitor circuit 170 may assume an almost ideal state, they cannot easily assume such a state, due to the changes in VCM resistance Rvcm by temperature and to changes in the gain of amplifiers 301 and 302. In this case, a monitor output proportional to the VCM current is obtained as is shown in FIG. 6. To correct the output of the monitor circuit 170, calibration should be effected as will be described below.

In the calibration, the output of the temperature sensor 24 is read through an ADC 250. The CPU 25 determines the temperature t0 inside the apparatus (VCM temperature) detected by the temperature sensor. The data representing the temperature t0, detected at the loading), is stored into the specified region of the RAM27 (Step 1)

Next, the CPU 25 supplies currents of different values (VCM currents), for example, currents having current values of IL and IS (hereinafter referred to as the VCM current IL and IS), in an unloading direction so that the head actuator 15 may remain fixed by the latch. By reading the monitor output of the monitor circuit 170 via the ADC 250 while the speed of VCM 14 is 0, back electromotive forces VL and VS are measured for the VCM currents IL and IS, respectively. The data representing the forces VL and VS is stored in the specified regions of RAM27, as values calibrated at the time of loading (Step S2, S3). Thus, the relation that the back electromotive force monitored and the VCM current shown in FIG. 6 have when the speed of VCM 14 is 0 is determined.

Therefore, the back electromotive force can be correctly calculated from a difference between the back electromotive force the monitor circuit 170 detects at the time of the head loading and the back electromotive force monitored when the speed of VCM 14 is 0 versus the VCM current value.

Thus, if the VCM current I flows in the VCM 14 (in the loading direction) in the head-loading control process (Step 4), the CPU 25 will read the output of the monitor circuit 170 at that time. The CPU 25 will measure the back electromotive force V0 if the VCM current has value I. The data representing the back electromotive force V0 in the specified region of RAM27 (Step S41).

Based on back electromotive force monitor values VL and VS obtained by calibration conducted by using two VCM currents IL and IS generated in advance, and the back electromotive force V0 generated this time from VCM current I at the head loading, the CPU25 calculates a corrected back electromotive force V from the following equation by means of linear approximation (Step S42).

$$V=V0-\{(VL-VS)/(IL-IS)\}*(I-IS)+VS \quad (4)$$

The value, $\{(VL-VS)/(IL-IS)\}*(I-IS)+VS$ in equation (4), is obtained from the VCM current—back electromotive force characteristic determined by linear approximation in a VCM speed 0 state shown in FIG. 3. This value is the back electromotive force generated when the VCM current I flows.

Obviously, the back electromotive force (voltage) V corrected by the above-mentioned equation (4) is a corrected offset of the back electromotive force monitor circuit.

After the back electromotive force V is corrected, the CPU25 calculates the speed of the present VCM 14 by multiplying the counter electromotive voltage V by the specified speed conversion coefficient (Step S43). Thus, the CPU25 can conduct head-loading control, which follows the VCM speed obtained.

Figure 5:
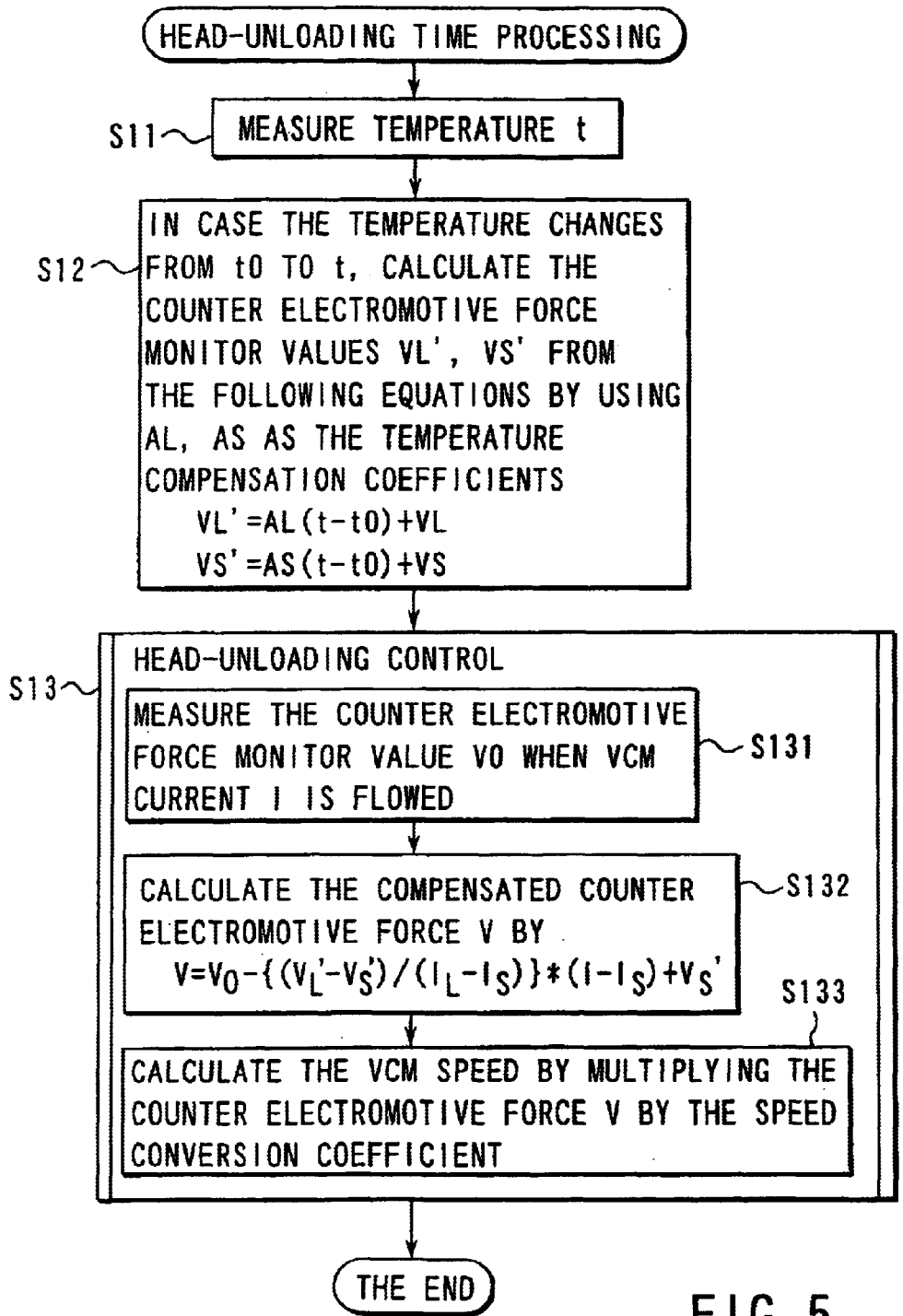
FIG. 5 is a flowchart explaining the sequence of process, including calibration, which is carried out during the head unloading in the apparatus.

The process including calibration at the time of head unloading will be described, with reference to the flowchart of FIG. 5.

The temperature in the apparatus (in particular, the temperature of VCM14) can change, from the time of the head loading to the time of the head unloading. The temperature t0 at the time of head loading and the temperature t at the time of head unloading may differ. In other words, the temperature may change between the time of head loading and the time of head unloading. If this is the case, the back electromotive force cannot be corrected in accordance with the equation (4), by using, as in the head-loading control, the back electromotive forces VL and VS calibrated by applying two VCM currents IL and IS at a temperature t0.

However, the resistance value variation of the VCM resistance Rvcm is proportional to the temperature changes. The change in the back electromotive force based on temperature at the time the VCM currents IL and IS flow is also proportional to the temperature change. Therefore, in the manufacture of the apparatus, the coefficients representing the change in the back electromotive force, which results from the temperature changes at a certain rate, are obtained by calculation or measurement beforehand, while the VCM IL and IS currents keep flowing. The coefficients, thus obtained are stored as temperature compensation coefficients AL and AS, respectively, in the specified region of the FROM 26. The coefficients AL and AS are used to achieve the temperature compensation at the time of unloading, as will be described below.

Furthermore, if the temperature compensation coefficient AL and AS are obtained by measurement each apparatus and are then stored only in the FROM 26 of the apparatus, they will reflect the state of the apparatus at an extremely high accuracy. On the other hand, if the temperature compensation coefficients AL and AS are obtained by calculation, their accuracy will is lower than those obtained by measurement, though the they can be applied commonly to each apparatus (it is possible to set it in the ROM in advance).

To unload the head 12 to the ramp 200, the CPU25 reads the temperature t in the apparatus, detected by the temperature sensor 24, through the ADC 250. The CPU 25 then stores that temperature t (the temperature detected at the unloading) in the specified region of the RAM 27 (Step S11).

Figure 7:
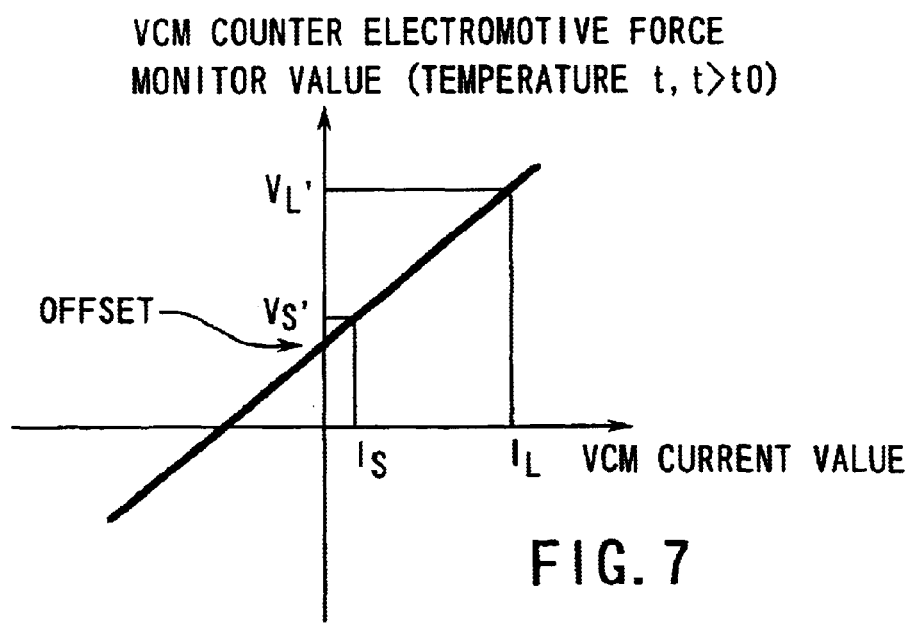
FIG. 7 depicts a relation the current flowing in the VCM may have with the output of the monitor circuit when the temperature of the VCM is higher than in the case shown in FIG. 6.

If the temperature t in the apparatus at the time of unloading changes from the temperature t0 in of the apparatus at the time of loading, the CPU 25 will use temperature compensation coefficients AL and AS stored in advance in FROM26 since the characteristics of the back electromotive force monitor value versus VCM current will change from FIG. 6 to FIG. 7. The CPU 25 then conducts re-calibration by the following equations on 2 kinds of VCM currents IL and IS (Step S12).

$$VL'=AL(t-t0)+VL \quad (5)$$

$$VS'=AS(t-t0)+VS \quad (6)$$

This re-calibration converts the back electromotive forces VL and VS obtained by calibration at temperature t0 at the head loading, into the back electromotive forces VL and VS corrected by applying the temperature variation from the temperature t0 to the present temperature. The back electromotive forces VL are VS are stored in the specified regions of the RAM 27.

In this way, the changes in the values calibrated on the basis of the temperature can be corrected at the time of head unloading, without supplying currents or conducting calibration. That is, the values can be corrected without employing a system in which the head 12 moves inevitably because the VCM speed 0 cannot be maintained and accurate calibration is therefore difficult to accomplish.

Therefore, to unload the head 12, a correct back electromotive force can be calculated by subtracting the back electromotive force corrected in Step 12 with respect to the VCM current I, in accordance with the temperature (in a state in which the VCM speed is 0), from the counter electromotive monitor value obtained by the monitor circuit 170 at the time of the head unloading.

In the present embodiment, the CPU25 reads the monitor output of the monitor circuit 170 during the head-unloading control (Step S13) when VCM current I (VCM current of current value I) is flowed to VCM 14 (in the unloading direction). The CPU 25 measures the back electromotive force V0 monitored when the VCM current has the value I. The CPU 25 stores the back electromotive force V0 in the specified region of the RAM27 Step S131).

The CPU25 performs calculation of the following equation (7)(Step 132), thereby obtaining a corrected back electromotive force V.

$$V=V0-\{(VL'-VS')/(IL-IS)\}*(I-IS)+VS \quad (7)$$

Where VL' and VS' are the back electromotive forces monitored at the present temperature t0 (temperature compensated as calibration value), IL and IS are VCM currents obtained in Step 12 and applied in the re-calibration, and V0 is the back electromotive force monitored in Step S13 for VCM current I at the time of head unloading.

After the CPU 25 multiplies the back electromotive force V by the specified speed conversion coefficient, thus obtaining a proper corrected back electromotive force (voltage), the CPU25 calculates the speed of the present VCM14 (Step S133). Thus, the CPU25 can conduct head-unloading control that follows the obtained VCM speed.

The temperature compensation coefficients AL and AS may be stored in a non-volatile memory means other than the FROM 26. For example, the coefficients AL and AS may be stored in the specified regions of disk 11 (preferably, so-called system regions for storing various system control information which the users cannot make access to).

The embodiment described above is a magnetic disk apparatus. Nonetheless, the present invention is not limited to a magnetic disk apparatus. Rather, the invention can be applied to other types of disk memory apparatuses, such as an opto-magnetic disk apparatus, which have a system for loading and unloading the head.

As explained above in detail, the relation between the temperature changes and the variation of the back electromotive force calibrated is determined in advance in the present invention. To carry out the head unloading, the calibration value obtained at the head loading is corrected in accordance with the difference between the temperature detected in the apparatus during the head loading and the temperature detected in the apparatus during the head unloading. A correct calibration value can therefore be obtained, without supplying a current to the voice coil motor to conduct re-calibration. Hence, the VCM speed is determined by applying the calibration value. The speed detection error made at the head-unloading control, due to the temperature change occurring from the time of the head loading is decreased by conducting speed control of the head unloading. This accomplishes stable head unloading.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk memory apparatus comprising:

a head for reading or writing data on or from a disk;

voice coil motor for moving said head in a radial-direction of said disk in order to execute head-loading or head-unloading of said head;

monitor means for detecting back electromotive force generated by said voice coil motor;

calibration means for supplying a plurality of different currents to said voice coil motor at the time of the head-loading, and determining a first value based on back electromotive forces each of which corresponds to the plurality of different currents and are detected said monitor circuit;

a temperature sensor for detecting a temperature of said disk memory apparatus;

correction means for correcting the first value on the basis of a difference between a first temperature detected by said temperature sensor at the time of the head-loading and a second temperature by said temperature sensor at the time of the head-unloading to acquire a second value, and load/unload control means for controlling the head-loading or the head-unloading of said head in such a manner that said load/unload control means drives said voice coil motor according to the first value at the time of the head-loading and drives said voice coil motor according to the second value at the time of the head-unloading.

2. The disk memory apparatus according to claim 1, further comprising:

storage means for storing a table which relates a plurality of second values to a plurality of predetermined temperature differences of the disk memory apparatus between the head-loading and head-unloading, and wherein said correction means acquires the second value corresponding to the difference between said first temperature and said second temperature.

3. The disk memory apparatus according to claim 2, wherein said plurality of predetermined second values are values determined based on a characteristic of said disk memory apparatus.

4. The disk memory apparatus according to claim 1, further comprising:

storage means for storing coefficients corresponding to a plurality of predetermined temperature differences of the disk memory apparatus between the head-loading and head-unloading, and wherein said correction means corrects the first value by calculating a product of the difference and a coefficient corresponding to the difference to acquire the second value.

5. The disk memory apparatus according to claim 1, wherein said monitor means includes:

a sense resistor series-connected to a motor coil of said voice coil motor and for detecting current of the motor coil, and a variable resistor configured to vary a resistance based on said sense resistor and a resistance of said voice coil motor so as to set the back electromotive force of said monitor circuit independent of the current of the motor coil.

6. The disk memory apparatus according to claim 5, wherein elements of said resistor are integrated.

7. A disk memory apparatus comprising:

a head configured to read or write data on or from a disk;

a voice coil motor configured to move said head in a radial-direction of said disk in order to execute head-loading or head-unloading of said head;

a monitor circuit configured to detect a back electromotive force generated by said voice coil motor;

a first processor configured to supply a plurality of different currents to said voice coil motor at the time of the head-loading, and determine a first value based on back electromotive forces each of which corresponds to the plurality of different currents and is detected said monitor circuit;

a temperature sensor configured to detect a temperature of said disk memory apparatus;

a second processor configured to correct the first value based on a difference between a first temperature detected by said temperature sensor at the time of the head-loading and a second temperature by said temperature sensor at the time of the head-unloading to acquire a second value, and a load/unload controller configured to control the head-loading or the head-unloading of said head in such a manner that said load/unload controller drives said voice coil motor according to the first value at the time of the head-loading and drives said voice coil motor according to the second value at the time of the head-unloading.

8. The disk memory apparatus according to claim 7, further comprising:

a memory which stores a table which relates a plurality of predetermined second values to a plurality of predetermined temperature differences of the disk memory apparatus between the head-loading and head-unloading, and wherein said second processor acquires the second value corresponding to the difference between said first temperature and said second temperature.

9. The disk memory apparatus according to claim 8, wherein said plurality of predetermined second values are values determined based on a characteristic of said disk memory apparatus.

10. The disk memory apparatus according to claim 7, further comprising:

a memory which stores coefficients corresponding to a plurality of predetermined temperature differences of the disk memory apparatus between the head-loading and head-unloading, and wherein said second processor corrects the first value by calculating a product of a difference, the difference between the first temperature and the second temperature, and a coefficient corresponding to the difference between the first temperature to acquire the second value.

11. The disk memory apparatus according to claim 7, wherein said monitor circuit includes:

a sense resistor series-connected to a motor coil of said voice coil motor and configured to detect current of the motor coil, and a variable resistor configured to vary a resistance of said variable resistor based on said sense resistor and a resistance of said voice coil motor so as to set the back electromotive force of said monitor circuit independent of the current of the motor coil.

12. The disk memory apparatus according to claim 11, wherein elements of said variable resistor is integrated.

13. A method for controlling of a disk memory apparatus comprising the steps of:

supplying a plurality of different currents to voice coil motor at the time of head-loading;

detecting back electromotive forces of said voice coil motor on the basis of the plurality of different currents by monitor circuit;

determining a first value on the basis of the back electromotive forces;

detecting a first temperature of said disk memory apparatus;

controlling said voice coil motor according to the first value to execute the head-loading;

detecting a second temperature of said disk memory apparatus;

correcting the first value on the basis of a difference between the first temperature and the second temperature to acquire a second value, and controlling said voice coil motor according to the second value to execute the head-unloading.

14. The method for controlling of said disk memory apparatus according to claim 13 wherein the second value is determined in such a way as to select a second value in a plurality of predetermined second values corresponding to a plurality of predetermined temperature differences of the disk memory apparatus between the head-loading and head-unloading.

* * * * *